(12) United States Patent
Wang et al.

(10) Patent No.: US 11,226,969 B2
(45) Date of Patent: Jan. 18, 2022

(54) DYNAMIC DEEPLINKS FOR NAVIGATIONAL QUERIES

(71) Applicant: Microsoft Technology Licensing, LLC, Redmond, WA (US)

(72) Inventors: Dong Han Wang, Bellevue, WA (US); Xiaofei Huang, Beijing (CN); Jinghua Chen, Redmond, WA (US); Nanshan Zeng, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 995 days.

(21) Appl. No.: 15/055,535

(22) Filed: Feb. 27, 2016

(65) Prior Publication Data
US 2017/0249312 A1 Aug. 31, 2017

(51) Int. Cl.
*G06F 16/2457* (2019.01)
*G06N 20/00* (2019.01)
*G06F 16/951* (2019.01)

(52) U.S. Cl.
CPC ...... *G06F 16/24578* (2019.01); *G06F 16/951* (2019.01); *G06N 20/00* (2019.01)

(58) Field of Classification Search
None
See application file for complete search history.

(56) References Cited

U.S. PATENT DOCUMENTS 7,599,917 B2 * 10/2009 Meyerzon ............. G06F 16/951
7,761,448 B2    7/2010 Meyerzon et al.
8,103,652 B2 *  1/2012 Govani ............. G06F 17/30864
                                                      707/706
8,560,561 B2  10/2013 Govani et al.
8,583,622 B2  11/2013 Krishnan et al.
8,756,219 B2   6/2014 Chand et al.
9,311,168 B1 *  4/2016 Lewis ................. G06F 17/3053
9,317,621 B2 *  4/2016 French ................ G06F 16/9558
(Continued)

OTHER PUBLICATIONS

Marinou, Danny, "Google Deep Link Search Results for iOS", Published on: Jul. 22, 2015 Available at http://go-mashmobile.com/mcommerce-2/news-mcommerce-2/google-deep-link-search-results-for-ios/.

(Continued)

*Primary Examiner* — Ashish Thomas
*Assistant Examiner* — Mellissa M. Ohba

(57) ABSTRACT

Techniques for dynamically generating deeplink search results in response to navigational search queries. In an aspect, to address user search queries, a general-purpose search engine is provided in parallel with a dedicated engine for specifically ranking deeplinks. Upon identifying a received query as a navigational query, a parallel query is generated from a common domain and user query, and provided to the dedicated engine. The engine accesses relevant deeplink URL's from a search index, which may be frequently refreshed and updated with the most recent Web contents. Ranking of deeplink URL's may be performed according to an algorithm that processes query-level features and document-level features of URL's to be ranked. In an aspect, the algorithm may be trained from search engine logs and/or Web browser logs, by calculating a Log-based Normalized Discounted Cumulative Gain (LNDCG) designed to quantify relevance of search results to queries based on user click behavior.

20 Claims, 12 Drawing Sheets

(56) References Cited

U.S. PATENT DOCUMENTS

| | | | | |
|---|---|---|---|---|
| 9,465,676 B1* | 10/2016 | Lewis | ................ | G06F 17/3053 |
| 9,892,190 B1* | 2/2018 | Kirazci | ............... | G06F 17/3064 |
| 10,057,741 B2* | 8/2018 | Molinet | .............. | G06F 9/44505 |
| 2006/0036598 A1 | 2/2006 | Wu | | |
| 2006/0074903 A1* | 4/2006 | Meyerzon | ............ | G06F 16/951 |
| 2007/0038622 A1* | 2/2007 | Meyerzon | ......... | G06F 17/30864 |
| 2007/0255689 A1* | 11/2007 | Sun | .................. | G06F 17/30864 |
| 2009/0276414 A1* | 11/2009 | Gao | ................. | G06F 17/30867 |
| 2011/0083167 A1* | 4/2011 | Carpenter | ......... | G06F 17/30563 |
| | | | | 726/4 |
| 2011/0264673 A1* | 10/2011 | White | .............. | G06F 17/30867 |
| | | | | 707/750 |
| 2012/0179955 A1* | 7/2012 | French | ................ | G06F 16/951 |
| | | | | 715/207 |
| 2013/0031079 A1* | 1/2013 | El Daher | .......... | G06F 17/30867 |
| | | | | 707/706 |
| 2013/0110815 A1* | 5/2013 | Tankovich | ........ | G06F 17/30887 |
| | | | | 707/711 |
| 2013/0262427 A1* | 10/2013 | Parsana | ............. | G06F 17/30864 |
| | | | | 707/706 |
| 2013/0282683 A1* | 10/2013 | Kohavi | ................ | G06F 16/954 |
| | | | | 707/706 |
| 2014/0108373 A1* | 4/2014 | Abrahami | ......... | G06F 17/30893 |
| | | | | 707/706 |
| 2014/0359519 A1 | 12/2014 | Luu et al. | | |
| 2015/0156061 A1* | 6/2015 | Saxena | ................ | G06F 16/951 |
| | | | | 715/733 |
| 2016/0357716 A1* | 12/2016 | Douglas | ................ | G06F 16/22 |
| 2016/0357754 A1* | 12/2016 | Douglas | .............. | G06F 16/9535 |
| 2016/0357755 A1* | 12/2016 | Douglas | .............. | G06F 16/9535 |
| 2017/0249312 A1* | 8/2017 | Wang | ................ | G06F 17/3053 |

OTHER PUBLICATIONS

"SEO: Deep Links", Published on: Aug. 29, 2010 Available at http://www.1066internet.co.uk/seo/deep-links.html.

* cited by examiner

DYNAMIC DEEPLINKS FOR NAVIGATIONAL QUERIES

BACKGROUND

A navigational query is a type of Internet search query in which the user's intent is to locate a specific website or web page. In contrast to informational queries, which are more open-ended, navigational queries may typically be satisfied by search results that link directly to the desired website, and further to other more specific web pages within the website known as "deeplinks." For example, in response to a query for "Microsoft," it may be suitable for a search engine to provide results linking to the company homepage, as well as deeplinks to specific web pages for Microsoft downloads, popular Microsoft products, technical support, etc.

A search engine may employ specific deeplink generation and ranking mechanisms to serve the most relevant deeplinks when responding to a navigational query. For example, a search engine may store and reference a look-up table statically associating a list of ranked deeplinks with potential navigational query targets. Such deeplinks may be generated and ranked using offline, "static" mechanisms. However, relying only on static deeplinks undesirably omits the most up-to-date web content from deeplinks results, and further such static deeplinks are not flexibly configurable.

Accordingly, it is desirable to provide techniques for dynamically generating deeplinks for navigational queries in addition to static mechanisms, while simultaneously leveraging the up-to-date indexing and ranking capabilities of general-purpose search engines.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, various aspects of the subject matter described herein are directed towards techniques for designing a deeplinks generator to serve navigational queries. In an aspect, a dynamic deeplinks ranker may be provided in parallel with a static deeplinks generator and a general-purpose search engine. The deeplinks ranker ranks a plurality of deeplinks candidates based on inputs including query-level and context-specific features, as well as document-level features of deeplinks candidates. To train the deeplinks ranker, statistics including a Log-based Normalized Discounted Cumulative Gain (LNDCG) may be used to quantify the relevance of deeplinks results to reference queries. The LNDCG may further be adapted to train algorithms for ranking search results outside the context of deeplinks and navigational queries.

Other advantages may become apparent from the following detailed description and drawings.

DETAILED DESCRIPTION

Various aspects of the technology described herein are generally directed towards techniques for designing a dynamic deeplinks generator for a search engine serving responses to navigational queries.

The detailed description set forth below in connection with the appended drawings is intended as a description of exemplary means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein.

Figure 1:
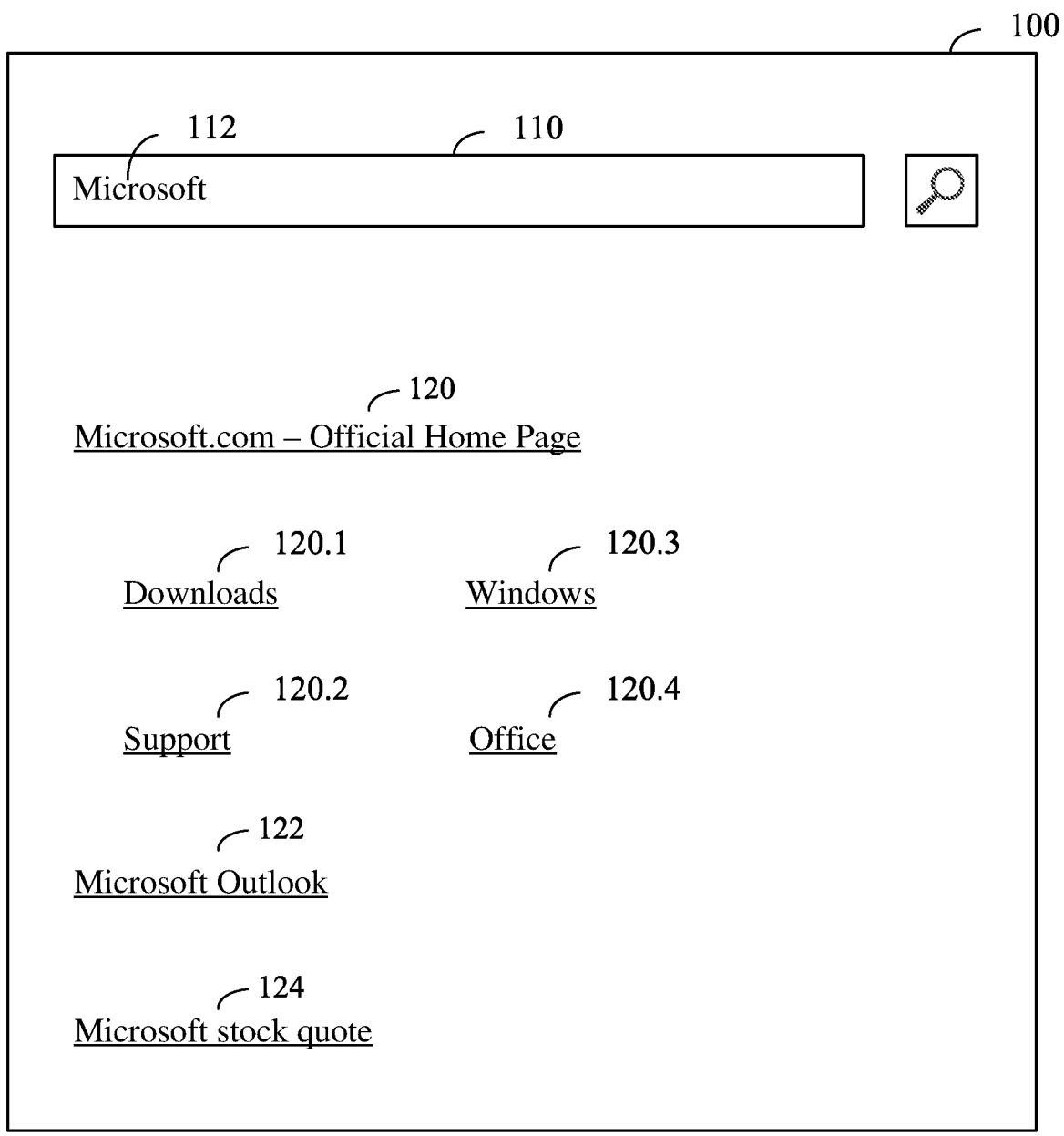
FIG. 1 illustrates a search engine interface showing certain aspects of the present disclosure.

FIG. 1 illustrates a search engine interface showing certain aspects of the present disclosure. Note FIG. 1 is shown for illustrative purposes only, and is not meant to limit the scope of the present disclosure to any particular page or text formats, domain names, deeplinks, or results shown.

In FIG. 1, a search engine results page (SERP) 100 of an exemplary search engine interface includes search engine query field 110, exemplary user query 112, and a plurality 120, 122, 124 of general search results returned by a general-purpose search engine (also denoted herein as "general search engine"). In the scenario shown, query 112 (illustratively shown in SERP 100 as "Microsoft") may be classified as a "navigational" query, i.e., a type of query in which the user's intent is to locate a website or web pages of a specific entity. In this Specification and in the Claims, the term "web" may be understood to refer to content found on the World Wide Web.

To serve results for navigational query 112, the search engine may provide results linking to a "top website" 120 (illustratively shown in FIG. 1 as "Microsoft.com-Official Home Page"), corresponding to the top-ranked search result for the search query, as well as "deeplinks" 120.1, 120.2, 120.3, 120.4, corresponding to other URL's (Uniform Resource Locators) linking to more specific web pages within the top website. In this Specification and in the Claims, deeplinks may denote links to websites from a "landing page" of the top website, or from other webpages sharing the same domain as the landing page. Deeplinks may generally be within the same domain or sub-domain as the landing page.

To generate and rank the most relevant deeplinks for display in the search results, a general search engine may support several specialized capabilities. First, an arbitrary query should be accurately classified as a "navigational query," so that the search engine knows to retrieve deeplinks when serving the results. Second, the retrieved deeplinks should be relevant to the navigational query, and further ranked by order of relevance.

Figure 2:
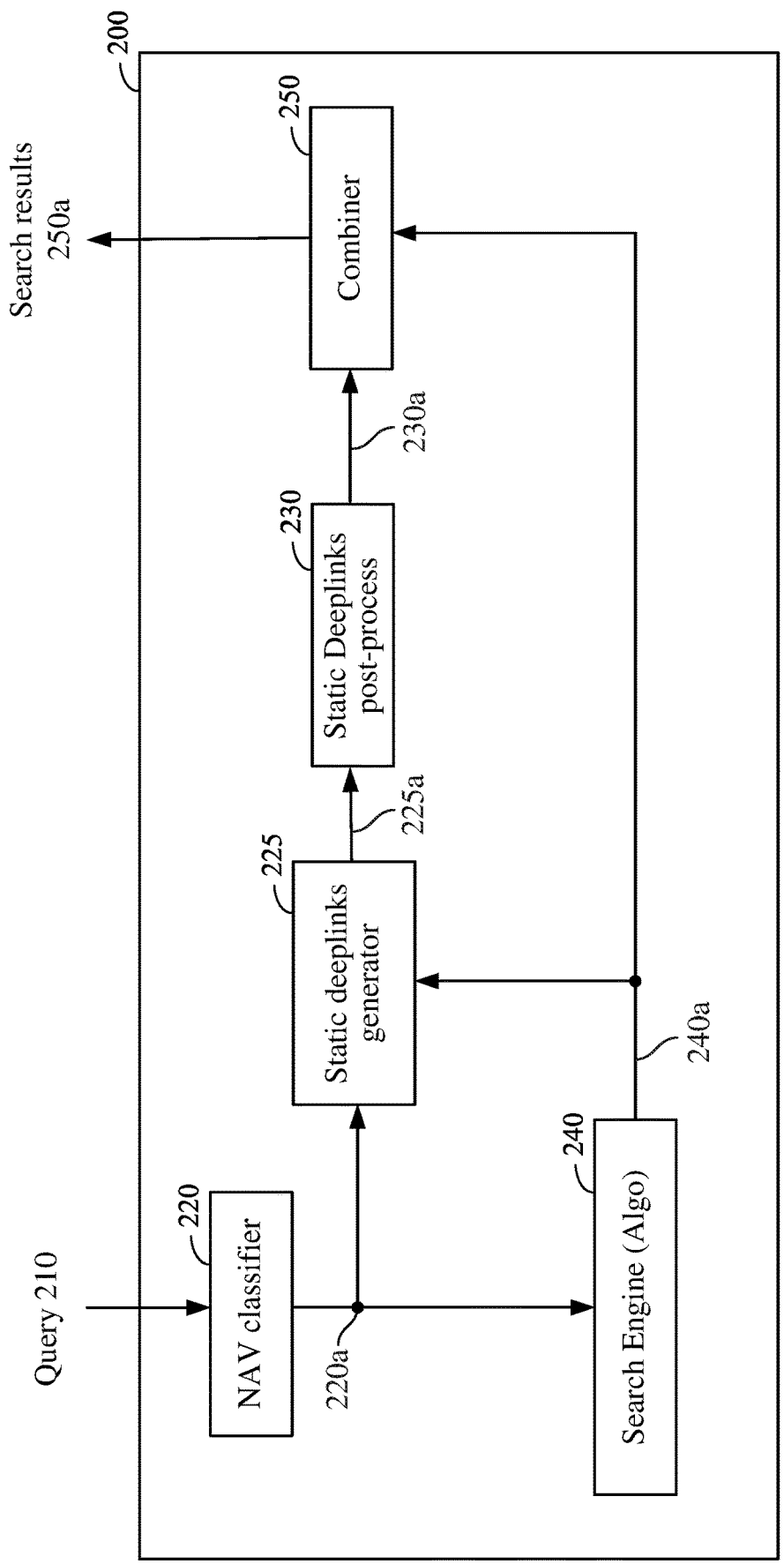
FIG. 2 illustrates a search engine architecture supporting static deeplink ranking.

According to one technique for ranking deeplinks, also denoted hereinafter as "static deeplink ranking," prior search engine usage data may be collected and analyzed from various offline sources to rank deeplinks. FIG. 2 illustrates a search engine architecture 200 supporting static deeplink ranking. Note FIG. 2 is shown for illustrative purposes only, and is not meant to limit the scope of the present disclosure to any particular implementing architecture for static deeplink ranking. It will be appreciated that architecture 200 is simplified, and certain aspects and functionality of a search engine have been omitted from architecture 200 for ease of discussion.

In FIG. 2, search engine 200 receives search query 210 from a user (not shown). In an illustrative implementation, query 210 may generally be entered (e.g., typed or input through voice command or other input modality) as a text string by the user into a computing device, e.g., a personal computer, smartphone, tablet, etc. Query 210 may be communicated to the search engine over any communications channel, e.g., over a wired or wireless connection, supporting Internet Protocol (IP) communications, etc.

Upon receiving query 210, search engine 200 determines the degree to which query 210 corresponds to a navigational query, using navigational (NAV) classifier block 220. In an implementation, the output 220a of block 220 may include query 210 (also referred to herein as the "raw query"), a reformatted version of query 210 (the "NAV query") suitable for processing by subsequent navigational query processing blocks, and a navigational score ("NAV score") estimating the likelihood that query 210 is in fact a navigational query.

Output 220a is provided to Search Engine ("Algo") core 240, which implements the general (e.g., non-deeplink) results retrieval and ranking functionality of search engine 200. For example, search engine core 240 generates and ranks a plurality of general search results 240a (also denoted "raw search results" herein) responsive to query 210.

Output 220a and search results 240a are provided to static deeplinks generator 225. In an implementation, generator 225 retrieves a plurality of URL's 225a (ranked in order of relevance) that constitute the "static deeplinks" associated with, e.g., a top result in search results 240a. The ranked deeplinks 225a retrieved by generator 225 may be determined based on, e.g., static techniques such as mining the records or "logs" of search engines or web browsers as further described hereinbelow.

Deeplinks 225a are processed by static deeplinks post-process block 230 to generate post-processed static deeplinks 230a. In an implementation, post-process block may perform, e.g., generation of captions, titles, or other operations to render deeplinks 225a more suitable for display in the SERP.

Post-processed static deeplinks 230a and Algo results 240a are processed by combiner 250 to generate search results 250a. In an implementation, combiner 250 performs merging of static deeplinks 230a with Algo results 240a, as well as de-duplication (or "de-duping") of URL's or webpages that may appear in both static deeplinks 230a and Algo results 240a. Search results 250a may then be output by search engine 200, e.g., in the format as shown for SERP 100 in FIG. 1.

In an implementation, static deeplinks 225a retrieved by generator 225 may be derived from associations, e.g., stored in a look-up table, between a navigational query target and a set of ranked deeplinks statically stored for that target. To generate such associations, offline sources such as search engine query and results logs and Web browser logs may be utilized, if available.

In particular, search engine query and results logs (also denoted "search engine logs" herein) from many users may be collected and analyzed to determine the most relevant deeplinks for common navigational queries. For example, such logs may provide per-query data such as query strings submitted to a search engine over a cumulative time period, per-query time stamps, number of results returned on corresponding SERP's, etc. Search engine logs may further indicate data for each result clicked by a user corresponding to a search query, e.g., Uniform Resource Locators (URL's) of clicked results, associated query string, position on results page, time stamp, etc.

Static deeplinks may further or alternatively be generated from other records of user search behavior, e.g., logs of Web browsers that are used to access the search engine home page. Mining browser logs provides information on user click activity subsequent to a user leaving an SERP, and may thus provide important indicators for generating and ranking deeplinks, such as may be unavailable to search engine designers using only search engine logs.

Browser logs may further indicate websites frequently visited by users, e.g., after clicking on a top website served in an SERP by the search engine. For example, browser logs may reveal that visitors to the microsoft.com landing page frequently click on the "Downloads" link from the landing page, and such information may accordingly be utilized to highly rank the "Downloads" page as a deeplink associated with the "microsoft.com" top website.

Figure 3:
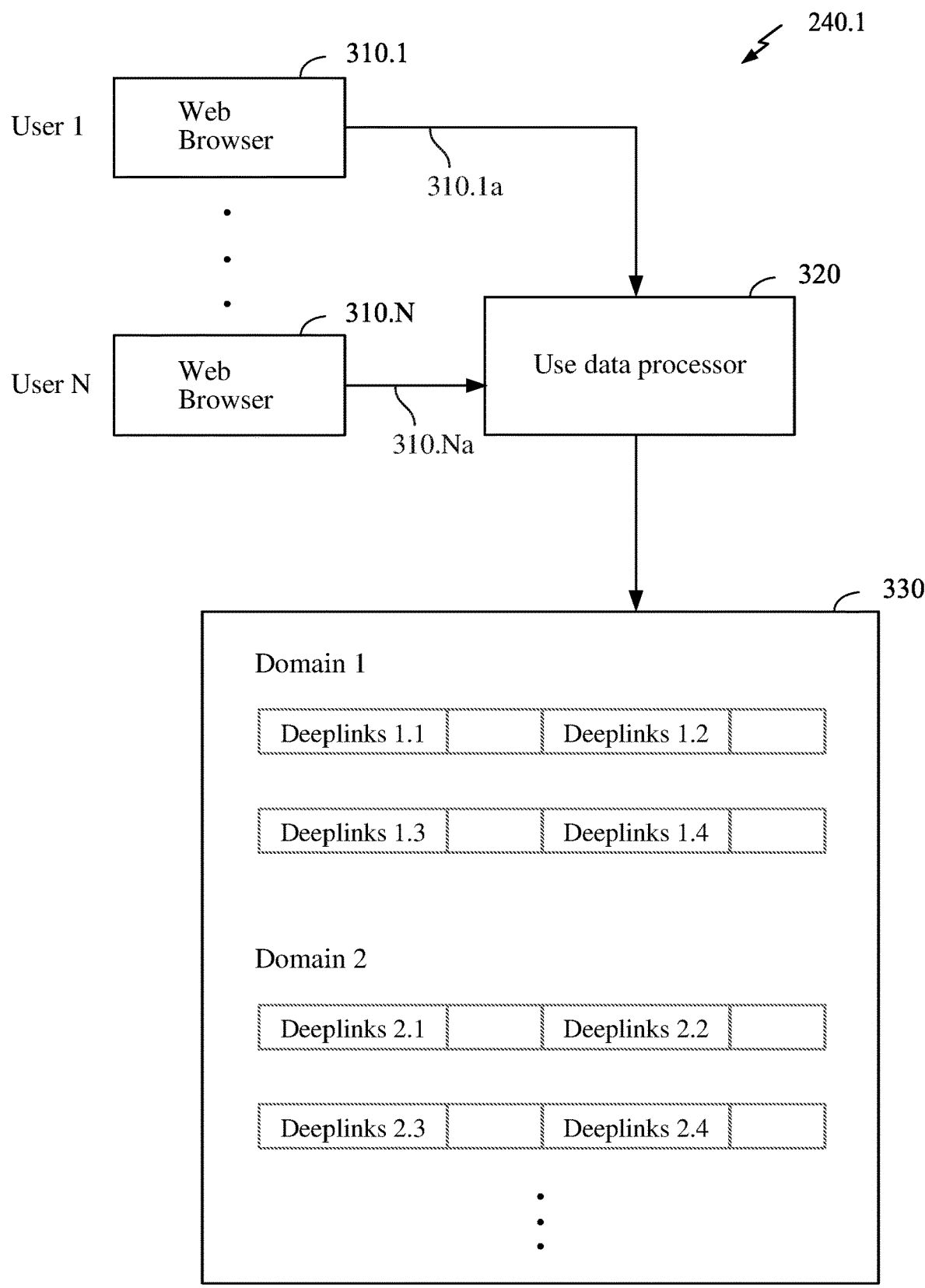
FIG. 3 shows an implementation of offline processing that may be performed to generate a ranked list of static deeplinks for each of a plurality of domains.

FIG. 3 shows an implementation of offline processing that may be performed to generate a ranked list of static deeplinks for each of a plurality of domains. In FIG. 3, a plurality N of users User 1 through User N interact with respective Web browsers 310.1 through 310.N. Log data 310.1a through 310.Na (e.g., search engine logs and/or Web browser logs), associated with users User 1 through User N, respectively, are received and processed by use data processor 320. In an implementation, search engine logs may reveal common websites or domains that are most frequently accessed from a particular SERP. Once identified, such websites may be ranked by frequency of visits using log data, and the ranked lists may be stored offline for retrieval by, e.g., static deeplinks generator 225.

In an implementation, the information and associations obtained from mining logs and/or other sources of use data may be organized as shown in block 330. In particular, a first Web domain Domain 1 may be associated with a plurality of ranked deeplinks 1.1, 1.2, 1.3, 1.4, a second Web domain Domain 2 may be associated with a plurality of ranked deeplinks 2.1, 2.2, 2.3, 2.4, etc. When a domain associated with a set of deeplinks is returned as the top website in response to a user navigational query, the associated set of ranked deeplinks such as shown in block 330 may be retrieved by generator 225.

To ensure freshness of the associated deeplinks, it is desirable to frequently update and refresh the required logs and/or other sources of use data used to identify the static deeplinks. However, doing so may consume significant dedicated resources or bandwidth. Furthermore, to accurately rank the deeplinks, it would be desirable to utilize additional indicators of user search behavior that are not generally available from search engine logs or web browser logs. For example, it would be desirable to incorporate rankings as indicated by generalized search engine results (e.g., not specifically restricted to relevance of web pages in the deeplinks context) corresponding to the submitted query. It would further be desirable to incorporate query-level features (e.g., specific features of the query string) and/or user context-specific features (e.g., user location when submitting the query) when performing deeplinks ranking.

Figure 4:
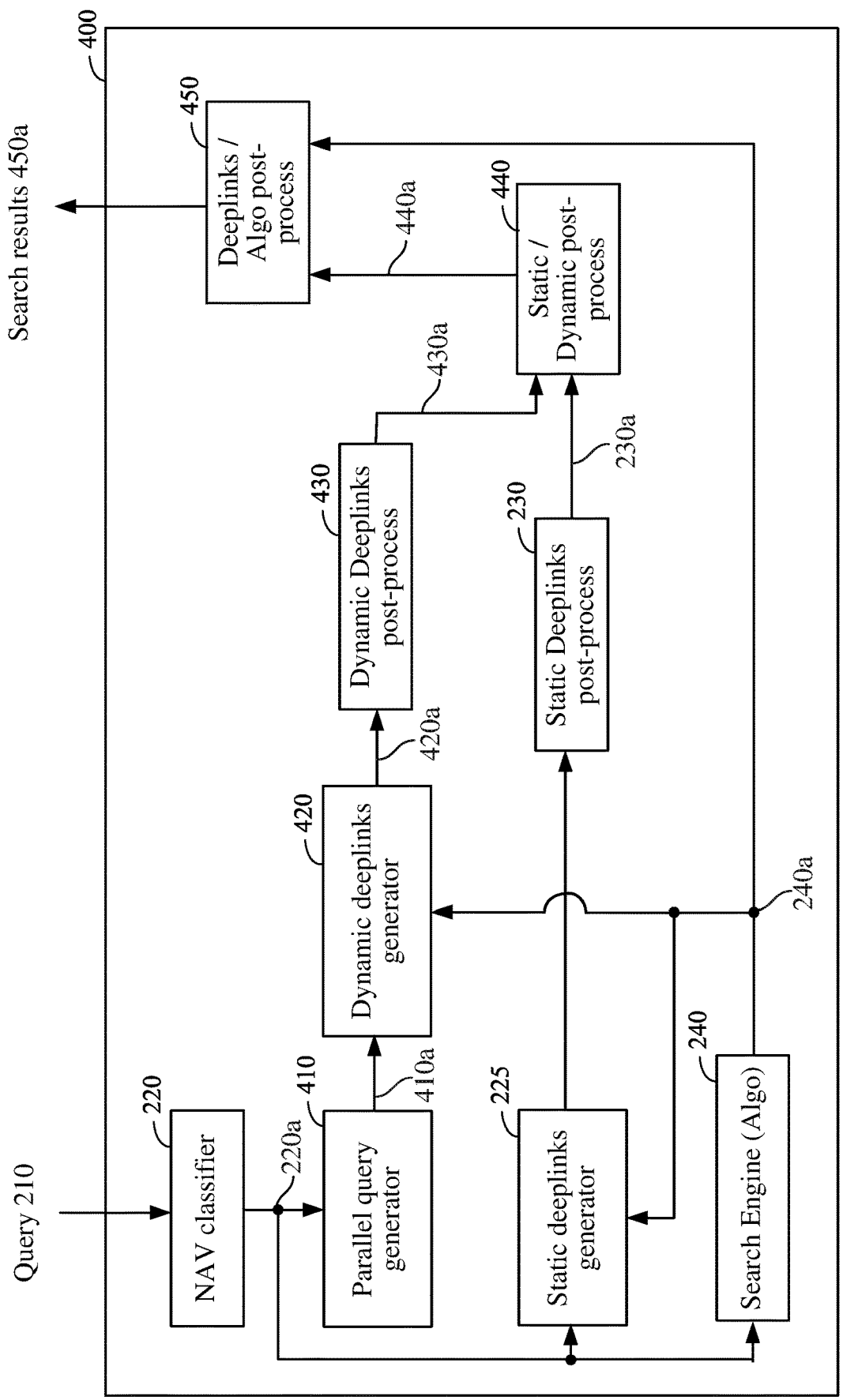
FIG. 4 illustrates a search engine architecture supporting static and dynamic deeplinks ranking.

FIG. 4 illustrates a search engine architecture 400 supporting static and dynamic deeplinks ranking. Note FIG. 4 is shown for illustrative purposes only, and is not meant to limit the scope of the present disclosure. Further note that similarly labeled elements in FIGS. 2 and 4 may generally correspond to elements performing similar functionality, unless otherwise noted, and thus description of blocks already described hereinabove may be omitted.

In FIG. 4, as described hereinabove with reference to FIG. 2, output 220a may include query 210, a NAV query derived from query 210, and a NAV score. Output 220a may further include a NAV URL, judged by NAV classifier 220 to be a navigational destination corresponding to query 210. Output 220a is provided to parallel query generator 410. Generator 410 generates a common domain name from the NAV URL, and appends this domain name to the NAV query to form a revised query 410a. In an exemplary embodiment, the format of revised query 410a may be such as to enable a general search engine to restrict its search to return only a subset of relevant search results which shares the common domain name. An illustrative format for revised query 410a may be, e.g., [site: <common domain URL>; Query: <NAV query>]. An alternative illustrative format for revised query 410a may be, e.g., [site: <common domain URL>; Query: <query 210>]; i.e., revised query 410a may also be formed from raw query 210 rather than the NAV query.

Returning to FIG. 4, revised query 410a is processed by dynamic deeplinks generator 420. In an exemplary embodiment, generator 420 may adopt an architecture similar to that used to perform general-purpose (e.g., non-deeplinks) search engine ranking, while further incorporating certain enhancements specifically customized to deeplinks ranking, as further described hereinbelow with reference to FIG. 5.

In an exemplary embodiment, generator 420 may provide the capability to refine its search results using certain conditional qualifiers, and such conditional qualifiers may be explicitly set by revised query 410a to restrict the search results to a particular subset, e.g., URL's sharing a common domain name. Generator 420 generates a set of results 420a (or "dynamic deeplinks"), which includes deeplinks associated with revised query 410a.

In an exemplary embodiment, to generate and rank deeplinks 420a, generator 420 may incorporate the search results 240a as returned by search engine 240, in particular, a top result of search results 240a. For example, generator 420 may incorporate knowledge of the top result of search results 240a to generate dynamic deeplinks 420a pertinent thereto.

Results 420a are provided to dynamic deeplinks post-process block 430 to generate dynamic deeplinks results 430a. Block 430 post-processes the deeplinks present in results 420a, e.g., by performing de-duplication and/or merging of entries in results 420a. In an exemplary embodiment, a contextual description generator (not shown) may generate a contextual description (or "snippet") associated with each deeplink, and further associate the contextual descriptions with the corresponding deeplinks in results 430a.

Static/dynamic post-process block 440 combines static deeplinks 230a with dynamic deeplinks 430a to generate results 440a. It will be appreciated that block 440 may implement various techniques (e.g., merging and de-duping) to resolve differences and redundancies in identity and ranking between static deeplinks 230a and dynamic deeplinks 430a. In an exemplary embodiment, the deeplinks contained in 230a and 430a are combined into a single composite list of deeplinks. In an exemplary embodiment, relative ranking between static deeplinks 230a and dynamic deeplinks 430a may be resolved by, e.g., giving preference to dynamic deeplinks 430a over static deeplinks 230a, or vice versa. In an exemplary embodiment, optimal weighting techniques, e.g., derived from machine learning, may be used to combine and rank static deeplinks 230a with dynamic deeplinks 430a.

Deeplinks/Algo post-process block 450 combines deeplinks 440a with Algo results 240a to generate final search results 450a. It will be appreciated that block 450 may implement various techniques (e.g., merging and de-duping) to resolve differences and redundancies in identity (e.g., title, URL's, etc.) and ranking between deeplinks 440a generated by static and dynamic deeplinks generators, and Algo results 240a from the general search engine 240.

In an exemplary embodiment, static deeplinks generator 225, static deeplinks post-process block 230, and static/dynamic post-process block 440 may be omitted. Accordingly, the search engine architecture may be based only on the dynamic deeplinks generator 420 and related dynamic components, and the general search engine 240. Such alternative exemplary embodiments are contemplated to be within the scope of the present disclosure.

Figure 5:
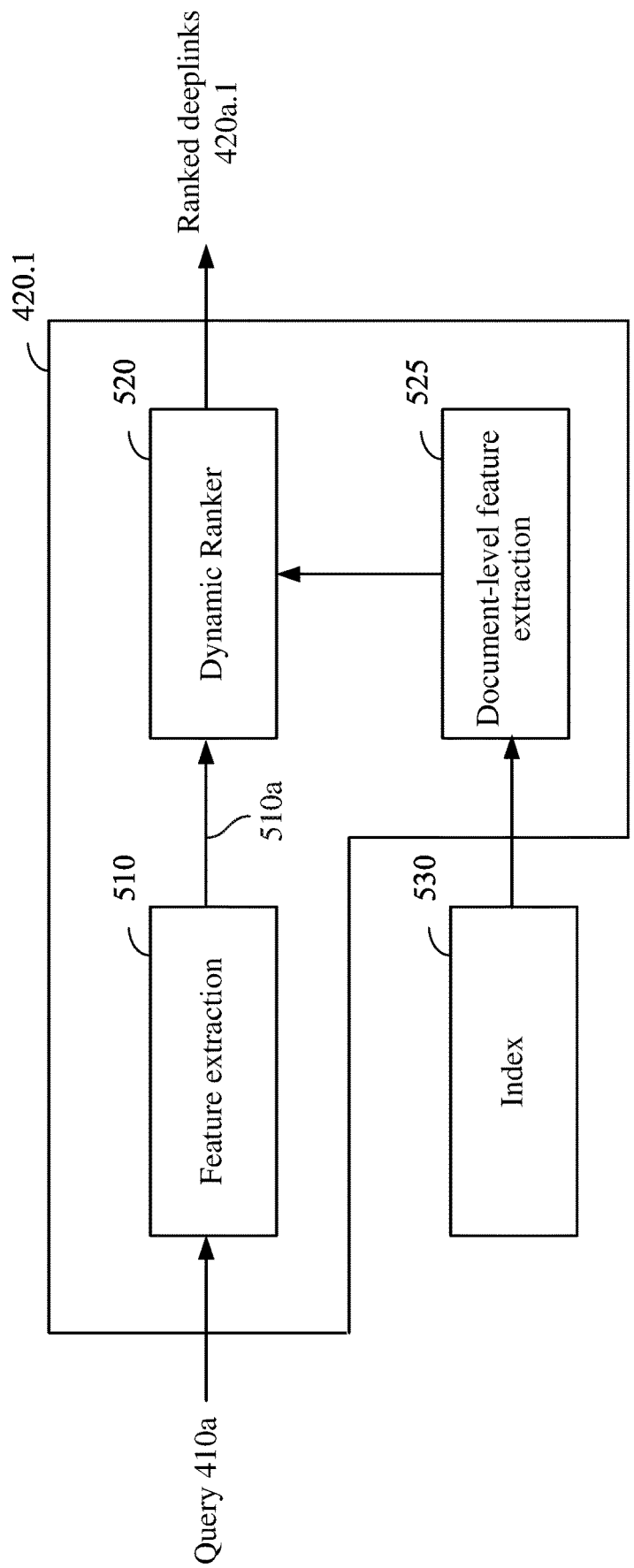
FIG. 5 illustrates an exemplary embodiment of a dynamic deeplinks generator according to the present disclosure.

FIG. 5 illustrates an exemplary embodiment 420.1 of dynamic deeplinks generator 420 according to the present disclosure. Note FIG. 5 is shown for illustrative purposes only, and is not meant to limit the scope of the present disclosure to any particular implementation of deeplinks generator 420.

In FIG. 5, generator 420.1 includes query feature extraction block 510 for processing revised query 410a. In an exemplary embodiment, block 510 may extract query-level features 510a of revised query 410a, including, e.g., number of words in query, presence of major or minor words, etc. In an exemplary embodiment, query-level features may affect the ranking of a specific deeplink website, e.g., based on the position of a word in the query in the deeplink webpage or website title, how many times the word appears in the deeplink webpage, etc.

Context feature extraction block 505 may further extract user context-specific features 505a corresponding to information about the user's context, e.g., user location when submitting the query, personal profile information, etc.

Document-level feature extraction block 525 extracts document-level features 525a of documents indexed by search index 530. Search index 530 may correspond to, e.g., an inverted file linking searched words or phrases to listings of relevant web pages. In an exemplary embodiment, dynamic deeplinks generator 420.1 may access the same search index 530 used by the general search engine, e.g., non-deeplinks search engine of which the deeplinks search engine is a component, and/or search engine 230 in FIG. 2.

In an exemplary embodiment, search index 530 may contain a store of URL's with corresponding web content, determined by periodically "crawling" or "scraping" the Internet. In an exemplary embodiment, search index 530 may further incorporate a "super fresh" tier or sub-index, corresponding to index entries whose contents are highly frequently refreshed and updated (e.g., every few seconds or minutes). For example, the super fresh tier may include entries for frequently accessed navigational domains and websites, e.g., microsoft.com and associated websites, thus ensuring that ranked deeplinks 420a.1 are up-to-date and reflect the latest Web content.

Features 505a, 510a and document-level features 525a are input to dynamic ranker 520, which ranks URL s from search index 530 to generate ranked deeplinks 420a.1. In an exemplary embodiment, generator 420 may be implemented using one or more "layers." For example, a first layer (L1) quickly identifies a potential candidate pool of relevant search results, a second layer (L2) applies more sophisticated ranking algorithms to rank the results returned by the lower layer, and a third layer (L3) aggregates the results from possible multiple L2's. In an exemplary embodiment, generator 420 may be provided as an online service (e.g., SaaS or "Software as a Service") accessible by a client or other software module over the Internet.

Figure 6:
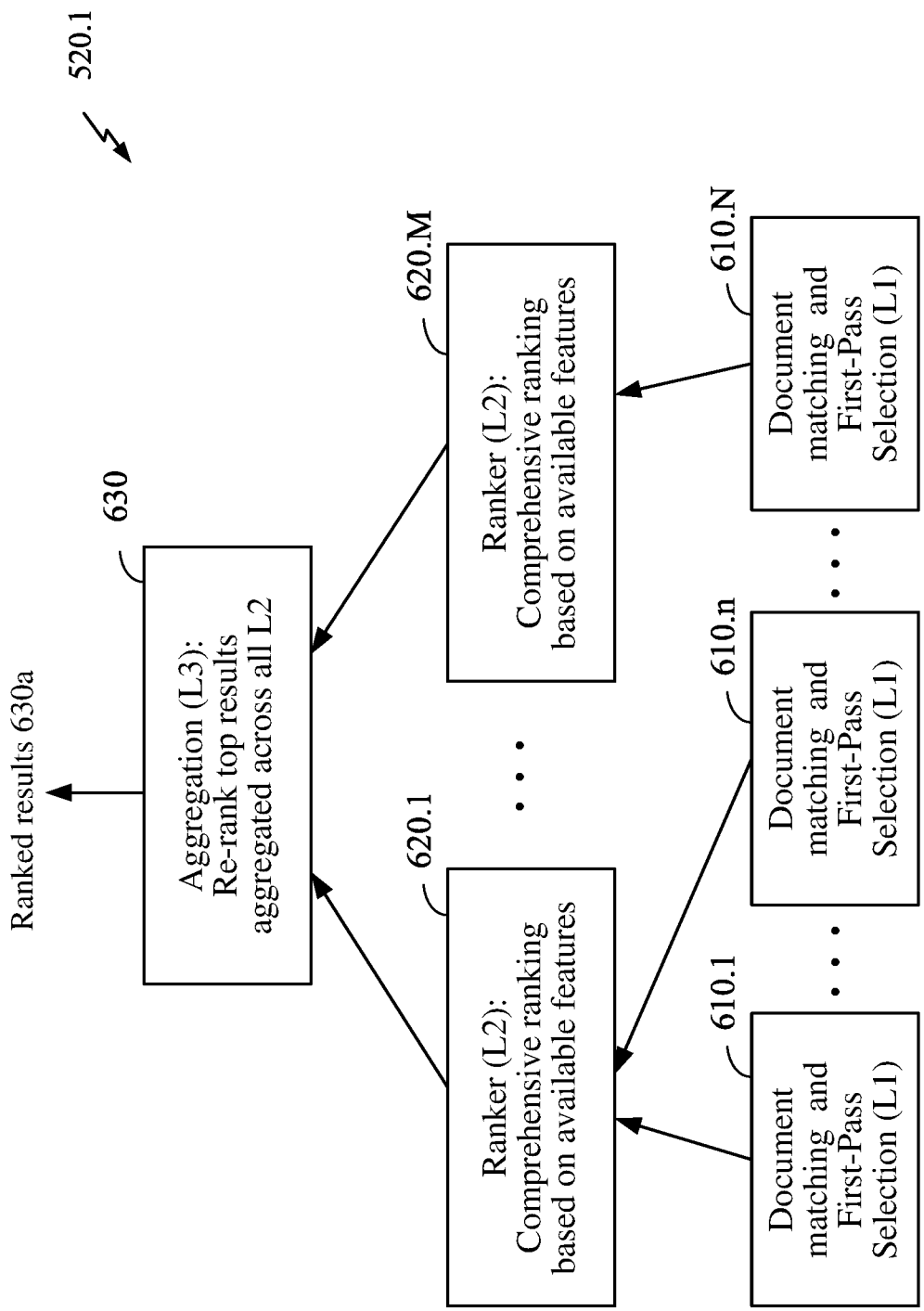
FIG. 6 shows an exemplary embodiment of a dynamic ranker utilizing layers to perform ranking.

FIG. 6 shows an exemplary embodiment 520.1 of dynamic ranker 520 utilizing such layers to perform ranking. Note FIG. 6 is shown for illustrative purposes only, and is not meant to limit the scope of the present disclosure to any particular types of rankers or classifiers that may be used to perform deeplinks ranking.

In FIG. 6, dynamic ranker 520.1 includes a plurality N of L1 processes 610.1 through 610.N that may be executed on corresponding hardware for implementing a "selection" or L1 service. In an exemplary embodiment, each L1 process performs matching of features (e.g., derived from features 505a, 510a) with features of a set of Web documents in index 530. Each L1 process may further assign a relevance score to each document for which there are a minimum number of matches between the features, and extract the top T candidate documents for sending to the next higher layer (e.g., L2). In an exemplary embodiment, T may be chosen depending on the bandwidth of hardware available for the processes.

Each L1 process may send the top T candidate documents to at least one L2 process 620.1 through 620.M of the next higher layer, also denoted the "Ranker" layer. In an exemplary embodiment, each L2 process rank a plurality of documents by deeplink relevance according to an algorithm. In an exemplary embodiment, such algorithm may implement one or more machine learning algorithms, trained as further described hereinbelow with reference to FIG. 7.

Each L2 process may send top-ranked candidates to an L3 process 630 of the next higher layer, also denoted herein as an "aggregation" layer. In an exemplary embodiment, process 630 receives ranked results from the plurality of L2 processes 620.1 through 620.M, and generates a list of ranked results 630a representing the aggregation of results from the L2 layer.

It will be appreciated that each of the L2 processes 620.1 through 620.M and L3 process 630 is shown as being coupled to a plurality of processes of the next lower layer, e.g., process 620.1 coupled to processes 610.1 through 610.n, etc. In alternative exemplary embodiments, any of the processes need not be coupled to a plurality of processes of the next lower layer. Furthermore, alternative exemplary embodiments of ranker 520.1 need not include all three layers, and may include two layers or even one layer instead. Such alternative exemplary embodiments are contemplated to be within the scope of the present disclosure.

In an exemplary embodiment, dynamic ranker 520 may provide the option to specifically enable or disable any of the layers when performing ranking in the deeplinks context. For example, in certain applications, it may be desirable to disable L3 if it is not needed. The capability to configure specific parameters of generator 420 advantageously allows the same architecture and designs used for general-purpose rank and search to be adopted in the deeplinks context. In an exemplary embodiment, L3 may be enabled in an architecture instance optimized for general search, while L3 may be disabled in an architecture instance optimized for deeplinks generation. Such exemplary embodiments are contemplated to be within the scope of the present disclosure.

Figure 7:
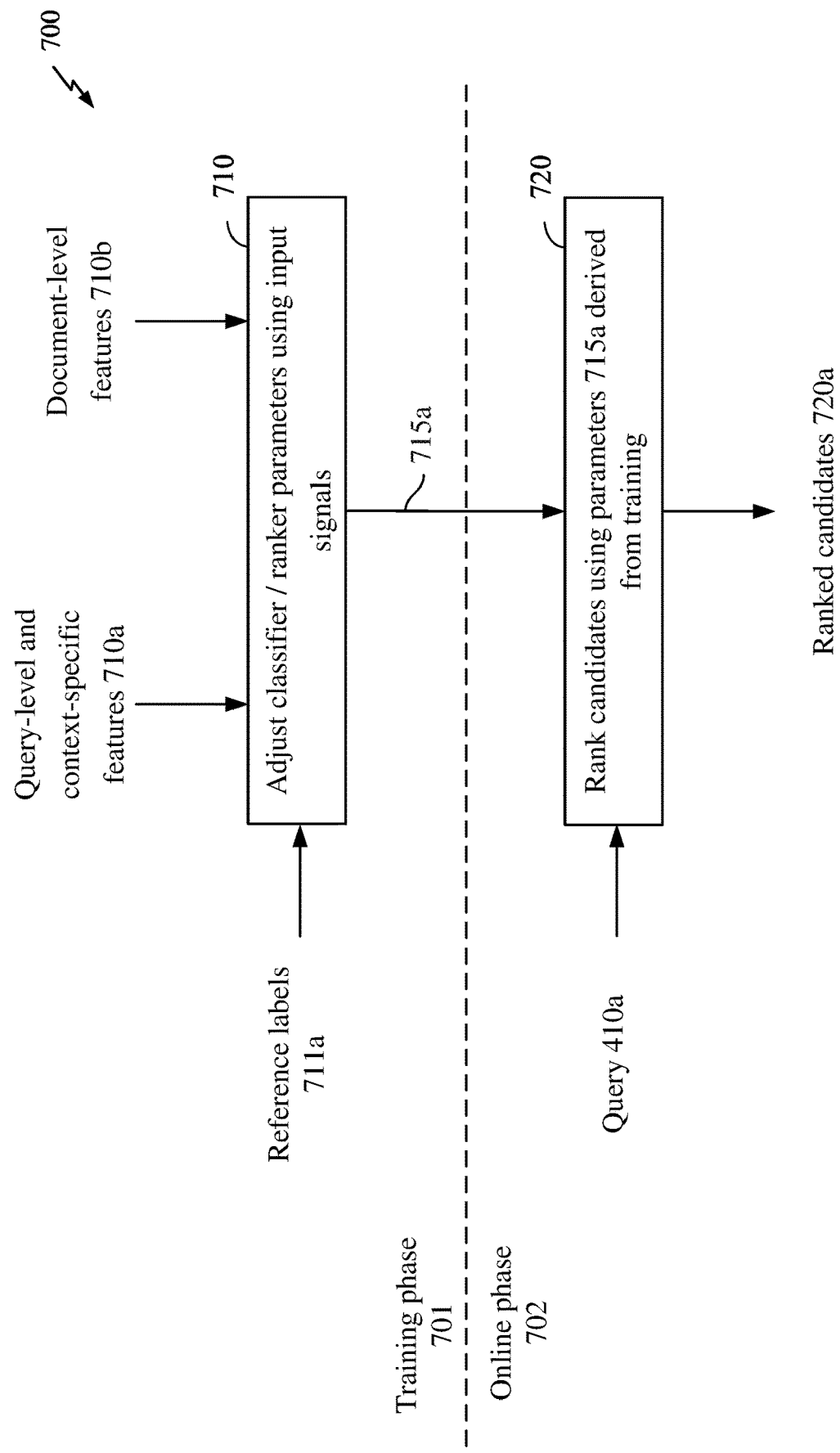
FIG. 7 illustrates an exemplary embodiment of training and execution of a dynamic ranker.

To serve the most relevant deeplinks for a navigational query, and perform ranking of the served deeplinks by relevance, dynamic ranker 520, e.g., one or more of L2 processes 620.1 through 620.M, may incorporate algorithms derived from offline training using machine learning techniques. FIG. 7 illustrates an exemplary embodiment 700 of training and execution of dynamic ranker 520. Note FIG. 7 is shown for illustrative purposes only, and is not meant to limit the scope of the present disclosure.

In FIG. 7, at training block 710, during a training phase 701, ranking algorithm parameters are trained and adjusted using a plurality of reference input signals, including reference query-level and/or user context-specific features 710a and reference document-level features 710b. In an exemplary embodiment, query-level features 710a may include, e.g., characteristics of reference search queries, e.g., obtained from search engine logs, etc. Query characteristics may include the content of a search string, e.g., syntax, number of words, etc. Features 710a may also include other characteristics associated with search query 210, including reference user context-specific features such as the location from which search query 210 was entered into a device, as may be ascertainable, e.g., from a Global Positioning System (GPS) module available on the device.

In an exemplary embodiment, reference document-level features 710b may include features of documents, such as deeplink candidate webpages, that are indexed by search index 530. In an exemplary embodiment, document-level features 710b may include characteristics derived from or otherwise associated with an indexed page, e.g., a static rank, spam status flag, junk status flag, soft 404 (e.g., "page not found") status flag, ad status flag, etc. Further document-level features 710b may include, e.g., WebMap, LinkAnchor, etc.

In an exemplary embodiment, during training phase 701, a large quantity of reference data may be provided, wherein particular reference queries are matched to particular deeplinks by relevance. For example, each sample of reference data may be characterized by a {query, URL} pair, and each pair further is further associated with query-level features corresponding to the "query" string of the {query, URL} pair, and document-level features corresponding to the "URL" designated by the {query, URL} pair.

In FIG. 7, a reference label signal 711a is further associated with each query-URL pair, quantifying the relevance of a given "document" in fulfilling the specified "query." Based on reference label signal 711a, block 710 may accordingly be trained to "learn" the relevance of certain documents to certain queries. For example, an algorithm may be trained to assign a higher relevance score to query-URL pairs having higher values of reference label signal 711a (i.e., indicating higher relevance), and a lower relevance score to query-URL pairs having lower values of reference label signal 711a.

In an exemplary embodiment, reference label signal 711a may be derived from human judges. In an alternative exemplary embodiment, reference label signal 711a may be derived from a "Log-based Normalized Discounted Cumulative Gain," or LNDCG, calculated based on user historical click data as obtained from logs, e.g., search engine logs. In an exemplary embodiment, LNDCG may be calculated as follows (LNDCG rules):

1) A score of 0 (NC score) is assigned to an instance of "Impression but No Click (NC)" from the log.

2) A score of −1 (QB score) is assigned to an instance of "Impression but Quick Back (QB)," wherein a "Quick Back" may be defined by a suitably low timing threshold, e.g., 2 seconds.

3) A score of +1 (C score) is assigned to an instance of "Impression and Click (C)."

4) A score of +2 (LC score) is assigned to an instance of "Impression and Last Click (LC)." It will be understood that "Impression and Last Click" may denote an instance of a user being shown a result, clicking on that result, and subsequently not returning to the search page (e.g., to browse other results).

Note the scores assigned to the instances described in the LNDCG rules are for illustrative purposes only, and are not meant to limit the scope of the present disclosure to any particular ranges or values of scores that may be assigned. In alternative exemplary embodiments, different scores may be assigned to any instances of events correlated to search result relevance. Such alternative exemplary embodiments are contemplated to be within the scope of the present disclosure.

From the above LNDCG rules, a metric denoted "LNDCG_Clicks" or "Clicks LNDCG" (computed on a per-training pair basis) may be calculated as follows (Equations 1):

$$\text{LNDCG\_Clicks} = \frac{QB*-1+(C-QB-LC)*1+LC*2}{C} = \frac{C-QB*2+LC}{C};$$

and a metric denoted "LNDCG_Impr" or "Impressions LNDCG" (computed on a per-training pair basis) may be calculated as follows (Equations 2):

$$\text{LNDCG\_Impr} = \frac{(Impr-C)*0+QB*-1+(C-QB-LC)*1+LC*2}{Impr} =$$
$$\frac{C-QB*2+LC}{C} * \frac{C}{Impr} = CTR*\text{LNDCG\_Clicks}$$

In Equations 1 and 2 hereinabove, "Impr" denotes the number of impressions, and "CTR" denotes "click-through rate," defined as the number of clicks (C) divided by the number of impressions (Impr).

In an exemplary embodiment, LNDCG_Impr may be calculated for a query-URL pair, over all appearances of that pair in a search engine log. For example, an illustrative pair such as {"Microsoft," "microsoft.com/download"}, associating the Microsoft "Download" deeplinks page with a "Microsoft" navigational query, may appear a total of 1000 times in search engine logs, corresponding to 1000 impressions. Furthermore, the illustrative pair may be associated with 100 Quick Back (QB) events, 500 Click (C) events, and 300 Last Click (LC) events. Given these statistics, LNDCG_Clicks and LNDCG_Impr may be calculated for the pair, and separately or jointly provided as reference labels 711a to training block 710 for the corresponding pair.

It will be appreciated that providing LNDCG-based metrics as reference label signal 711a may advantageously reduce the cost associated with requiring human judges to annotate the relevancy of query-document pairs. In an exemplary embodiment, LNDCG-based metrics may be combined with manual annotations by human judges in reference label signal 711a.

It will be appreciated that the calculation of the LNDCG metrics described hereinabove need not be limited to training algorithms for associating and ranking deeplinks to navigational queries. Rather, they may be generally applicable to training algorithms for associating any types of information to queries for which some or all of the listed events (e.g., NC, QB, C, LC) are available. Such alternative exemplary embodiments are contemplated to be within the scope of the present disclosure.

Following training phase 701, block 710 generates trained parameters 715a for block 720 to classify and rank documents, e.g., deeplinks, corresponding to query 410a. Ranking block 720 generates ranked dynamic deeplinks 720a.

Figure 8A:
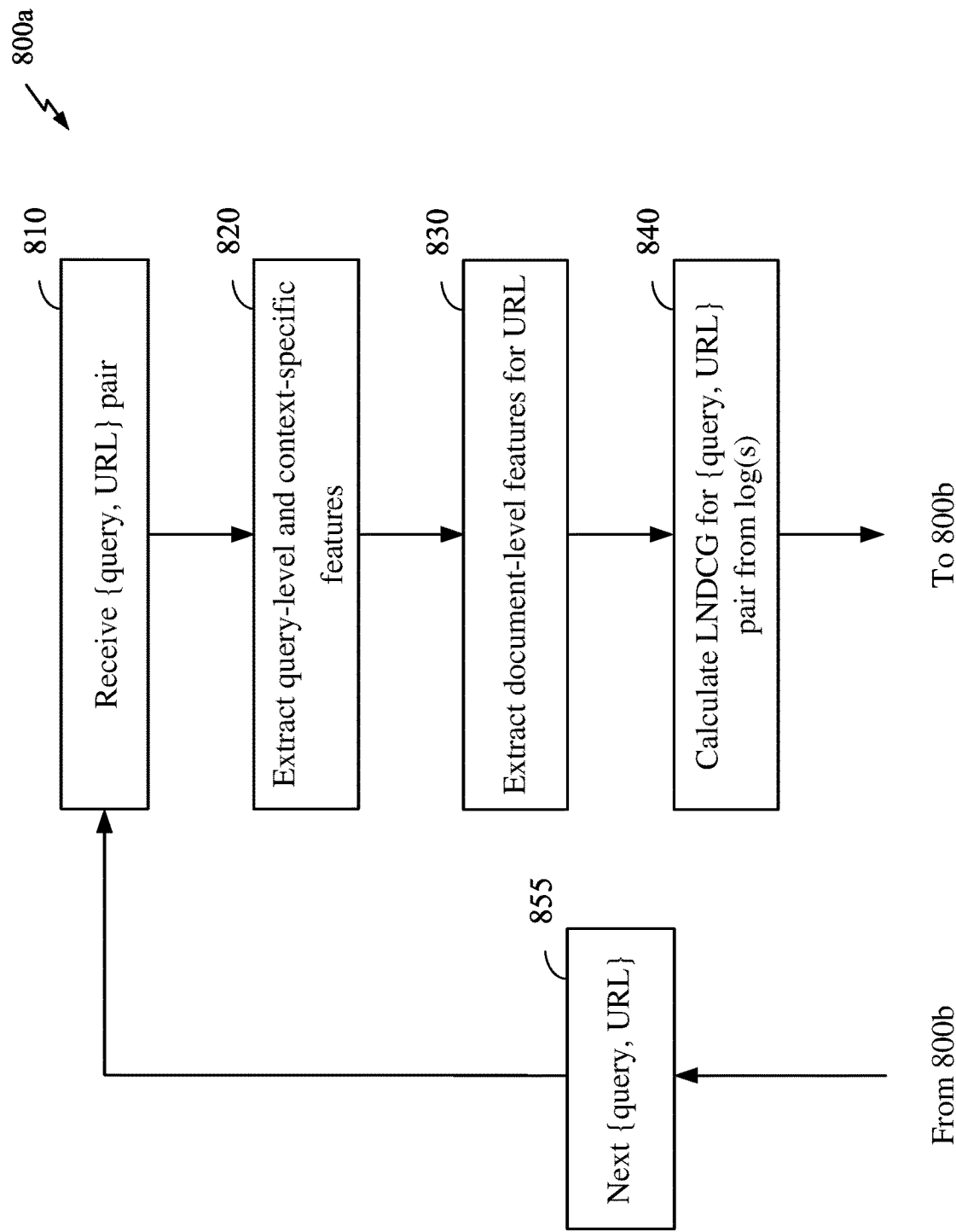
FIGS. 8A and 8B illustrate an exemplary embodiment of a method for training and ranking utilizing LNDCG.
Figure 8B:
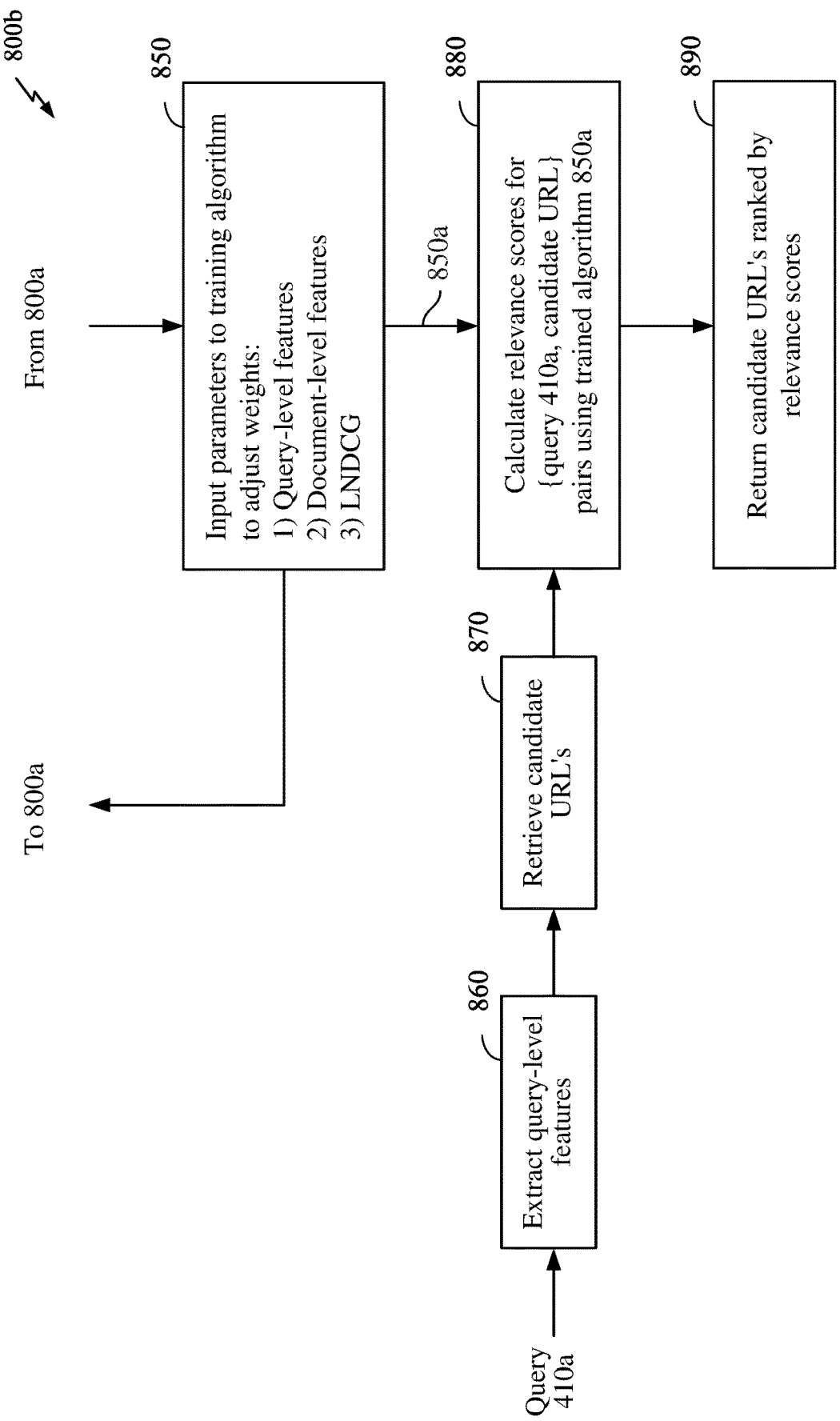

FIGS. 8A and 8B illustrate an exemplary embodiment 800a, 800b of a method for training and ranking utilizing LNDCG. Note FIGS. 8A and 8B are shown for illustrative purposes only, and is not meant to limit the scope of the present disclosure. It will be appreciated that method 800a, 800b need not be limited to training and executing an algorithm for ranking deeplinks search results, but may generally be applicable to training and ranking any types of search results using LNDCG.

In FIG. 8A, at block 810, a {query, URL} training pair is received. The training pair corresponds to a query-URL association for which it is desired to train the algorithm to generate a relevance score. The "query" referred to at blocks 810-850 is also denoted herein as a "reference query," as distinguished from "online query" referenced at block 860 hereinbelow. Furthermore, the "URL" referred to at blocks 810-850 is also denoted herein as a "reference URL," as distinguished from "candidate URL" referenced at block 870 hereinbelow.

At block 820, query-level and context-specific features are extracted for the query.

At block 830, document-level features are extracted for the reference URL.

At block 840, LNDCG is calculated for the {query, URL} pair. In an exemplary embodiment, LNDCG may be calculated according to, e.g., Equations 1 and/or 2. In an exemplary embodiment, scores for LNDCG may be assigned according to the "LNDCG rules" described hereinabove, or according to other rules for assigning scores to log events. In an exemplary embodiment, log events may be derived from, e.g., search engine logs, Web browser logs, etc.

In FIG. 8B, at block 850, a set of input parameters are input to the training algorithm to, e.g., adjust weights associated with the algorithm according to some optimization metrics. The set of input parameters may include the query-level features, context-specific features, document-level features, and LNDCG, as obtained from blocks 820-840.

Following block 850, method 800a, 800b proceeds to the next {query, URL} pair at block 855, and blocks 810-850 are repeated for the next {query, URL} pair.

After all {query, URL} pairs have been processed, trained algorithm 850a is available for ranking candidate URL's. At block 860, query-level features are extracted from a received query 410a. In an exemplary embodiment, query 410a may also be denoted herein as an "online" query, to distinguish from queries that are used during training, e.g., at blocks 810-850.

At block 870, candidate URL's are retrieved corresponding to query 410a, based on, e.g., query-level and context-specific features extracted at block 860. In an exemplary embodiment, candidate URL's may be a subset of all URL's indexed, and may be identified based on first-layer relevance search techniques.

At block 880, relevance scores are calculated for a plurality of {query 410a, candidate URL} pairs using trained algorithm 850a.

At block 890, the relevance scores for the top-ranked candidate URL's may be returned by algorithm 800.

Figure 9:
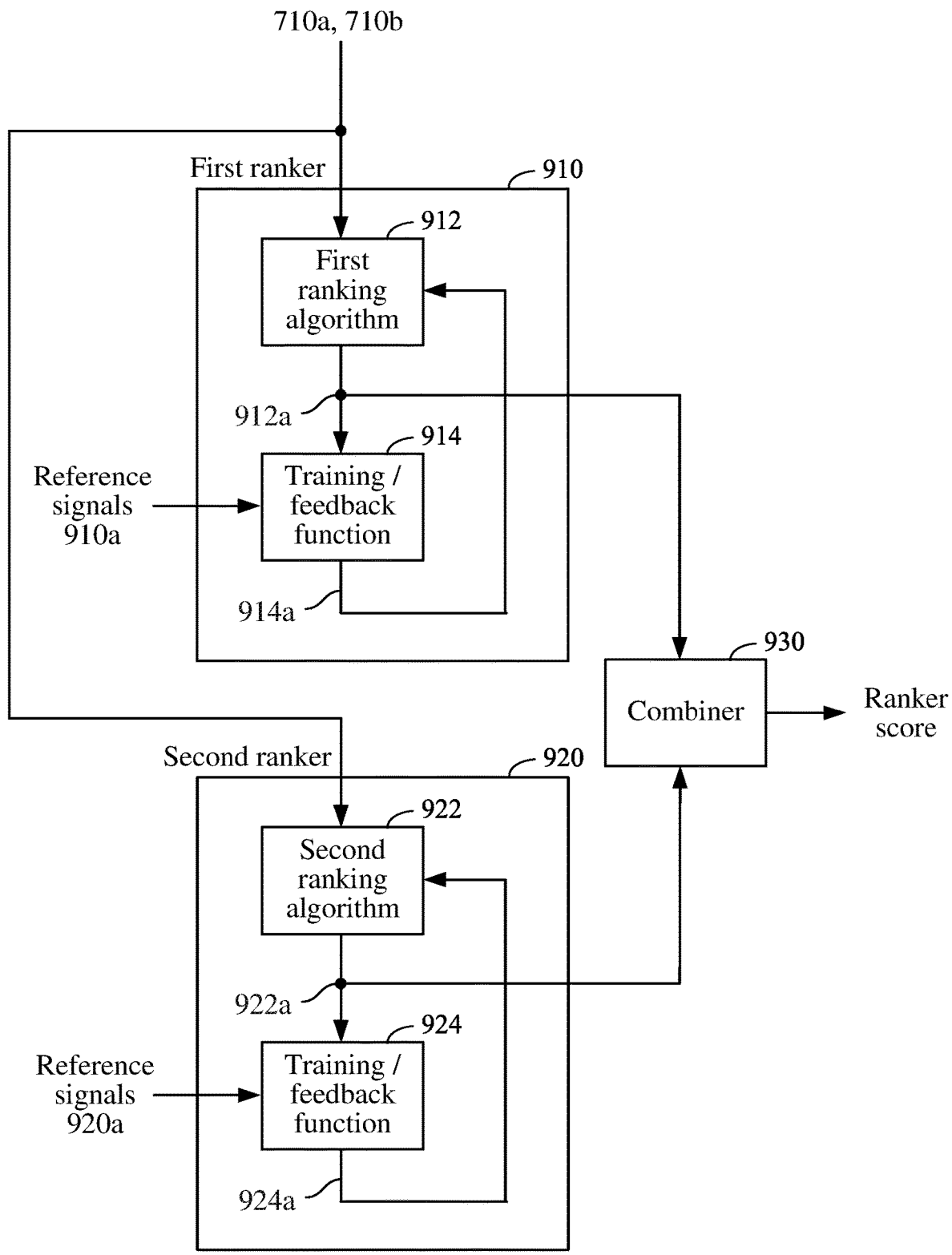
FIG. 9 illustrates an alternative exemplary embodiment of operations performed by an L2 process, wherein ranking may be performed using two separately trained algorithms may be used to derive algorithm parameters.

FIG. 9 illustrates an alternative exemplary embodiment 900 of operations performed by an L2 process, wherein ranking may be performed using two separately trained algorithms Note FIG. 9 is shown for illustrative purposes only, and is not meant to limit the scope of the present disclosure to any specific types of ranking schemes.

In FIG. 9, during a training phase, first ranker 910 receives query-level and context-specific features 710a and document-level features 710b for corresponding reference {query, URL} pairs, and assigns first ranker score 912a to each pair using first ranking algorithm 912. At block 914, first ranker score 912a is combined with reference signals 914a, e.g., log-based metrics such as LNDCG_Clicks, in a manner such as to indicate the accuracy of first ranker score 912a as compared to the reference signals for a given {query, URL} pair. In an exemplary embodiment, block 914 may implement, e.g., cross entropy loss and logistic regression functions to derive first training signal 914a. Training signal 914a is fed back to adjust the parameters of first ranking algorithm 912 so as to minimize the difference between the first ranker score 912a and the first ranker reference signals 914a.

Further in FIG. 9, during a training phase, second ranker 920 receives query-level features 710a and document-level features 710b for corresponding {query, URL} pairs, and assigns second ranker score 922a to each pair using second ranking algorithm 922. At block 924, second ranker score 922a is combined with ranker reference signals 920a, e.g., log-based metrics such as LNDCG_Impr, in a manner such as to indicate the accuracy of second ranker score 922a as compared to the ranker reference signals 920a for a given {query, URL} pair. In an exemplary embodiment, block 924 may implement a lambda rank function to derive a training signal 924a. Training signal 924a is fed back to adjust the parameters of ranking algorithm 922 so as to minimize the difference between second ranker score 922a and the ranker reference signals 920a.

In FIG. 9, during an online phase, first ranker score 912a may be computed for a candidate {query, URL} pair using trained first ranking algorithm 912, and further input to combiner block 930. Second ranker score 922a may further be computed for the candidate {query, URL} pair using trained second ranking algorithm 922, and also input to combiner block. Combiner block 930 may combine the ranker scores 912a, 922a to generate a composite ranker score 930a, which is used for actual ranking of {query, URL} pairs by, e.g., dynamic ranker 520. In an exemplary embodiment, combiner 930 may execute a sigmoid function to normalize first ranker score 912a, and apply a multiplicative scaling factor to normalized first ranker score 912a.

In an exemplary embodiment, all URL's and candidate URL's may correspond to deeplinks to be ranked. In an alternative exemplary embodiment, URL's and/or candidate URL's need not correspond to deeplinks, and may generally correspond to any results that may be returned by a search engine. Such alternative exemplary embodiments are contemplated to be within the scope of the present disclosure.

Figure 10:
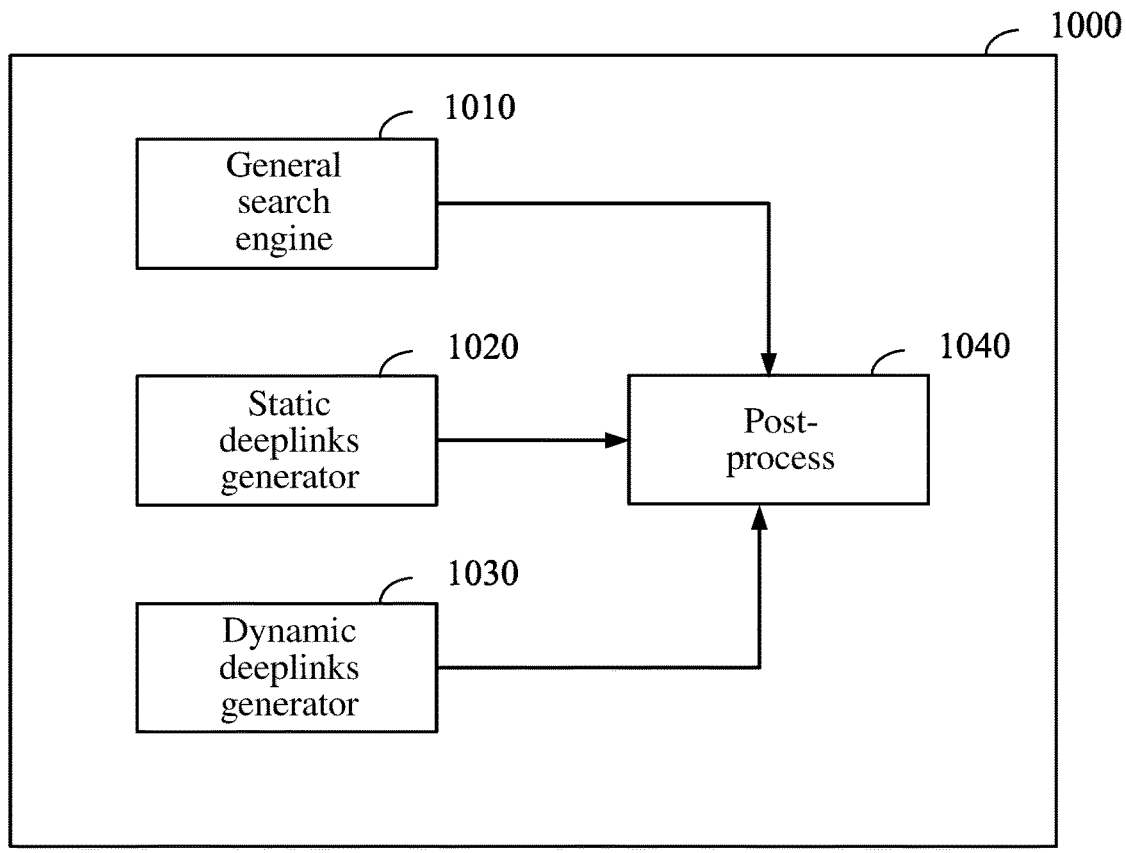
FIG. 10 illustrates an exemplary embodiment of an apparatus according to the present disclosure.

FIG. 10 illustrates an exemplary embodiment of an apparatus 1000 according to the present disclosure. Note FIG. 10 is shown for illustrative purposes only, and is not meant to limit the scope of the present disclosure to any particular apparatus shown.

In FIG. 10, apparatus 1000 comprises a general search engine 1010 generating a plurality of raw search results based on a user query. The plurality of raw search results comprise a top result associated with a common domain. Apparatus 1000 further comprises a static deeplinks generator 1020 generating a plurality of static deeplinks corresponding to the common domain. Apparatus 1000 further comprises a dynamic deeplinks generator 1030 generating a plurality of dynamic deeplinks corresponding to the common domain. Apparatus 1000 further comprises a plurality of post-process blocks 1040 combining the plurality of search results, the plurality of static deeplinks, and the plurality of dynamic deeplinks to generate final search results.

Figure 11:
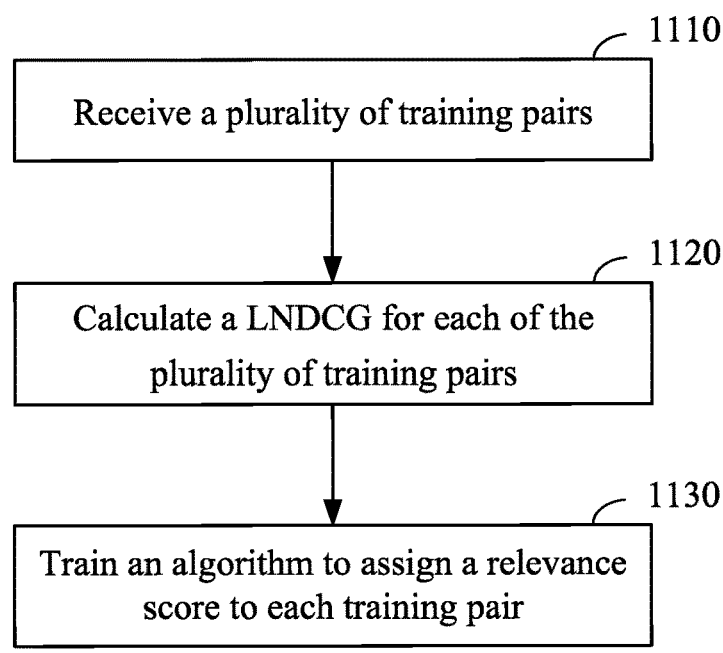
FIG. 11 illustrates an exemplary embodiment of a method according to the present disclosure.

FIG. 11 illustrates an exemplary embodiment of a method 1100 according to the present disclosure. Note FIG. 11 is shown for illustrative purposes only, and is not meant to limit the scope of the present disclosure to any particular method shown.

In FIG. 11, at block 1110, method 1100 comprises receiving 1110 a plurality of training pairs, each training pair comprising a training query and an indexed Uniform Resource Locator (URL), calculating 1120 a log-based normalized discounted cumulative gain (LNDCG) for each of the plurality of training pairs, training 1130 an algorithm to assign a relevance score to each training pair based on the calculated LNDCG and features extracted from the training query and the indexed URL, and using the trained algorithm, ranking 1140 a plurality of candidate URL's in response to a received online query based on the assigned relevance score.

Figure 12:
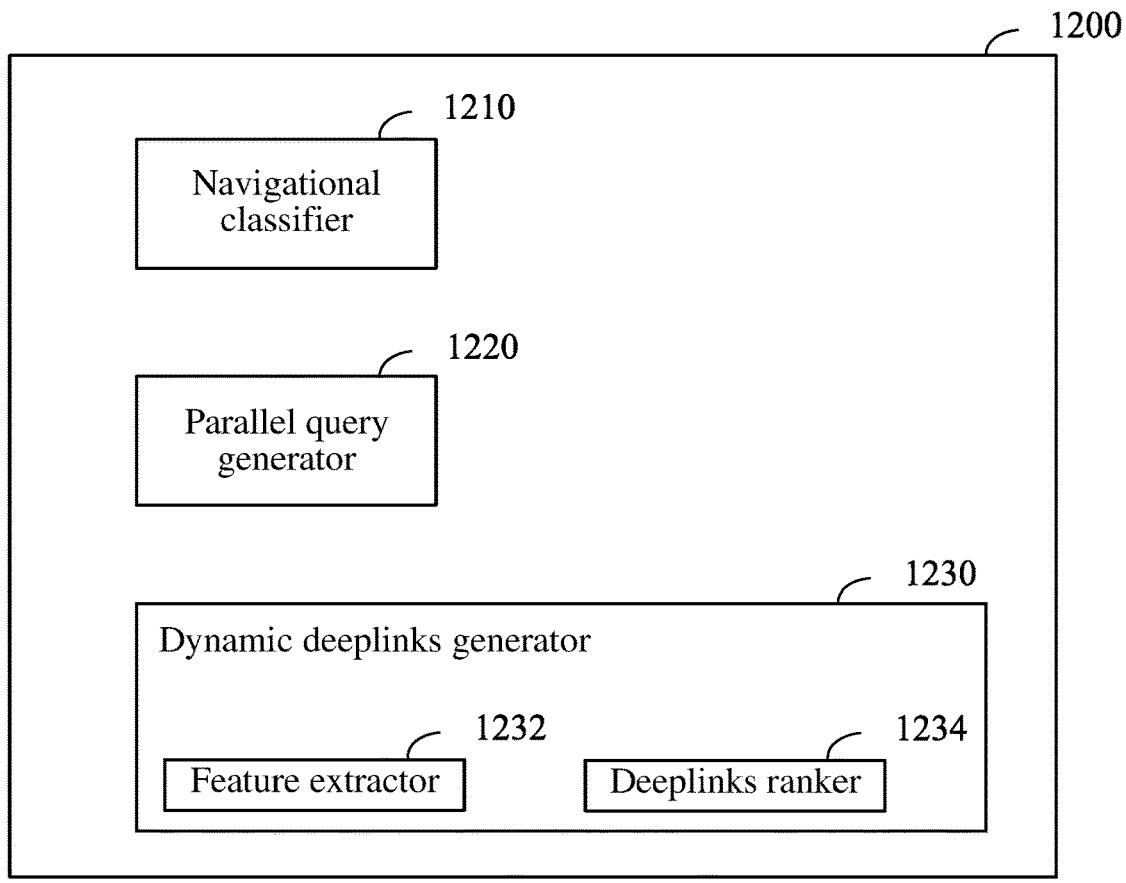
FIG. 12 illustrates an alternative exemplary embodiment of an apparatus according to the present disclosure.

FIG. 12 illustrates an alternative exemplary embodiment of an apparatus 1200 according to the present disclosure. Note FIG. 12 is shown for illustrative purposes only, and is not meant to limit the scope of the present disclosure to any particular apparatus shown.

In FIG. 12, apparatus 1200 comprises a navigational classifier 1210 generating a common domain in response to an original query; a parallel query generator 1220 generating a revised query comprising said original query and said common domain; a dynamic deeplinks generator 1230 generating a ranked list of dynamic deeplinks corresponding to said common domain, the dynamic deeplinks generator 1230 comprising: a query feature extractor 1232 extracting query-level features from said original query and document-level features from a plurality of Uniform Resource Locators (URL's) associated with the common domain; and a deeplinks ranker 1234 ranking the plurality of URL's based on said extracted query-level features and said document-level features.

Figure 13:
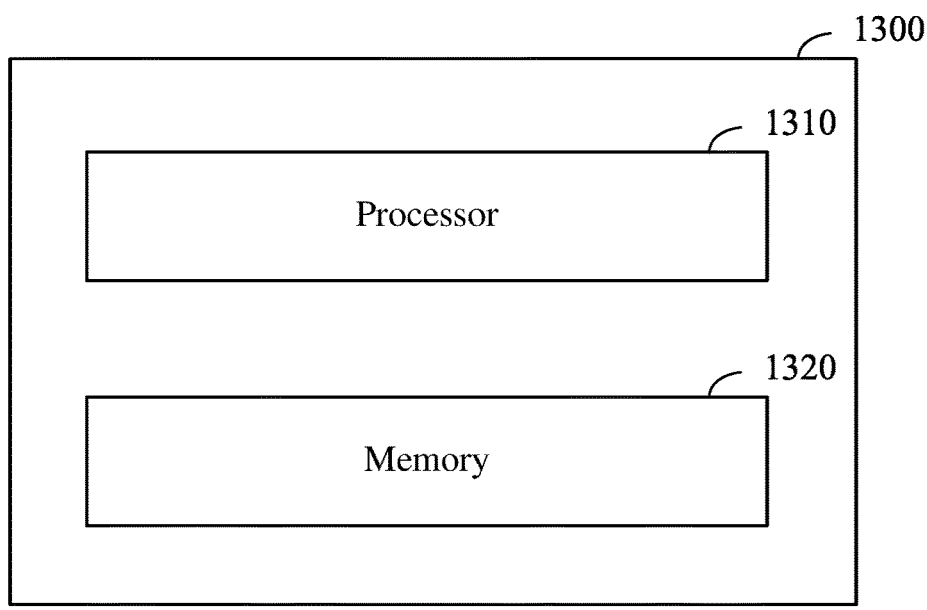
FIG. 13 illustrates an embodiment of a computing device according to the present disclosure.

FIG. 13 illustrates an embodiment of a computing device 1300 according to the present disclosure. Note FIG. 13 is shown for illustrative purposes only, and is not meant to limit the scope of the present disclosure to any particular computing device shown.

In FIG. 13, computing device 1300 includes a processor 1310 and a memory 1320 holding instructions executable by the processor to: receive a plurality of training pairs, each training pair comprising a training query and an indexed Uniform Resource Locator (URL); calculate a log-based normalized discounted cumulative gain (LNDCG) for each of the plurality of training pairs; train an algorithm to assign a relevance score to each training pair based on the calculated LNDCG and features extracted from the training query and the indexed URL; and using the trained algorithm, rank a plurality of candidate URL's in response to a received online query based on the assigned relevance score.

In an exemplary embodiment according to the present disclosure, an apparatus comprises: a general search engine generating a plurality of raw search results based on a user query, the plurality of raw search results comprising a top result associated with a common domain; a dynamic deeplinks generator generating a plurality of dynamic deeplinks comprising a ranked list of Universal Resource Locators (URL's) corresponding to the common domain, the dynamic deeplinks generator comprising: a query feature extraction block extracting at least one feature of the user query; a document-level feature extraction block extracting at least one feature from each of a plurality of Web documents; and a dynamic ranker generating the ranked list of Universal Resource Locators (URL's) corresponding to the plurality of Web documents based on features extracted by the query feature extraction block and the document-level feature extraction block.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

The functionality described herein can be performed, at least in part, by one or more hardware and/or software logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:

1. An apparatus comprising:
a hardware processor acting as:
   a general search engine generating a plurality of raw search results based on a user query, the plurality of raw search results comprising a first raw search result based at least in part on a ranking of general search results determined by a retrieval and ranking functionality of the general search engine;
   a parallel query generator generating a common domain name based on the user query to define a revised user query;
   a dynamic deeplinks generator generating a ranked list of Universal Resource Locators (URL's), the first raw search result sharing a Web domain in common with each URL in the ranked list of URL's as defined by the common domain name, the dynamic deeplinks generator comprising:
      a query feature extraction block extracting at least one feature of the revised user query;
      a document-level feature extraction block extracting at least one feature from each of a plurality of Web documents;
      a dynamic ranker generating the ranked list of URL's corresponding to the plurality of Web documents based on features extracted by the query feature extraction block and the document-level feature extraction block;
   a post-processor generating final search results by combining the ranking of the general search results corresponding to the first raw search result and dynamic deeplinks corresponding to the ranked list of URL's, wherein generating the final search results comprises one of de-duplicating or merging entries from the first raw search results and the ranked list of URL's, and the post-processor further weights the entries to combine the entries from the first raw search results and the ranked list of URL's, the weighting derived from machine learning; and
   a communicator configured to, responsive to the user query and the revised user query, serve the final search results to a network device.

2. The apparatus of claim 1, further comprising:
a static deeplinks generator generating a plurality of static deeplinks, the first raw search result further sharing the Web domain in common with the plurality of static deeplinks; and
wherein the post-processor comprises a plurality of post-process blocks combining the plurality of raw search results, the plurality of static deeplinks, and the plurality of URL's generated by the dynamic deeplinks generator to generate the final search results.

3. The apparatus of claim 1, the dynamic ranker comprising at least one computer implementing an algorithm calculating a score associated with the revised user query and a URL in the ranked list of URL's, wherein the revised user query comprises the common domain name generated from a navigational URL, the domain name appended to a navigational query to form the revised query.

4. The apparatus of claim 3, the algorithm derived from machine learning techniques, wherein the machine learning techniques train a ranker to assign a rank score to a plurality of reference query-level and context-specific features associated with reference user queries and a plurality of document-level features associated with a plurality of reference documents based on a plurality of reference labels, and wherein the dynamic deeplinks generator further comprises a context feature extraction block extracting at least one user context-specific feature.

5. The apparatus of claim 4, the plurality of reference labels comprising Clicks Log-based Normalized Discounted Gain or Impressions Log-based Normalized Discounted Gain.

6. The apparatus of claim 4, the context-specific features comprising a location from which a user query was entered by the user.

7. The apparatus of claim 3, the dynamic ranker comprising at least one computer identifying at least one document matching query-level features of the user query, wherein the plurality of Web documents processed by the document-level feature extraction block comprises at least one URL corresponding to the at least one identified document.

8. The apparatus of claim 2, the dynamic ranker further comprising at least one computer aggregating ranked lists of URL's generated by a plurality of dynamic rankers to generate the ranked list of URL's.

9. The apparatus of claim 6, wherein at least one computer aggregating the ranked lists of URL's is selectively enabled or disabled by setting a configuration parameter.

10. The apparatus of claim 2, the static deeplinks generator comprising a look-up table associating each of the plurality of raw search results with a ranked list of URL's and the dynamic deeplinks generator refines the first raw search result using conditional qualifiers set by the revised user query, the revised user query being formed from a raw user query.

11. A method comprising:
receiving a plurality of training pairs, each training pair comprising a training query and an indexed Uniform Resource Locator (URL);
calculating a log-based normalized discounted cumulative gain (LNDCG) for each of the plurality of training pairs;
training an algorithm to assign a relevance score to each training pair based on the calculated LNDCG and features extracted from the training query and the indexed URL;
using the trained algorithm, ranking a plurality of candidate URL's in response to a received online query based on the assigned relevance score, each of the plurality of candidate URL's sharing a single Web domain in common with a raw search result derived from a ranking of a plurality of raw search results generated by a general search engine based on a user query and determined by a retrieval and ranking functionality of the general search engine, wherein the Web domain corresponds to a common domain name generated based on the user query and a navigational URL, the domain name appended to a navigational query to form a revised query resulting in ranking of a subset of the candidate URL's; and
generating final search results by combining the ranking of the plurality of raw search results corresponding to the training pairs and dynamic deeplinks corresponding to the ranked list of URL's, wherein generating the final search results comprises one of de-duplicating or merging entries from the training pairs and the ranked list of URL's, and further weighting the entries to combine the entries from the training pairs and the ranked list of URL's, the weighting derived from machine learning.

12. The method of claim 11, each training query comprising a navigational query.

13. The method of claim 11, the calculating the LNDCG comprising, for each occurrence of a training pair in a search engine log:
adding a NC score to a per-training pair LNDCG when the indexed URL corresponds to an instance of Impression but No Click;
adding a QB score to a per-training pair LNDCG when the indexed URL corresponds to an instance of Impression but Quick Back;
adding a C score to a per-training pair LNDCG when the indexed URL corresponds to an instance of Impression and Click; and
adding a LC score to a per-training pair LNDCG when the indexed URL corresponds to an instance of Impression and Last Click;
wherein the NC score is greater than the QB score, the LC score is greater than the C score, and the C score is greater than the NC score.

14. The method of claim 13, the NC score equal to 0, the QB score equal to −1, the C score equal to +1, and the LC score equal to +2.

15. The method of claim 13, the calculating the LNDCG further comprising:
dividing the per-training pair LNDCG by the C score added over all occurrences of the training pair in a search engine log; and
multiplying the result of the dividing by a click-through rate.

16. The method of claim 11, the training the algorithm comprising applying a gradient boosting algorithm.

17. An apparatus comprising:
a hardware processor acting as:
a navigational classifier generating a first Web domain in response to an original query;
a parallel query generator generating a common domain name based on the original query to define a revised query comprising the original query and the first Web domain, wherein the common domain name is appended to a navigational query to form the revised query;
a dynamic deeplinks generator generating a ranked list of Universal Resource Locators (URL's) each having a Web domain in common with the first Web domain, the dynamic deeplinks generator comprising:
a feature extractor extracting query-level features from the original query and document-level features from a plurality of URL's each sharing a Web domain in common with the first Web domain;
a deeplinks ranker ranking the plurality of URLs based on the extracted query-level features and the document-level features; and
a post-processor generating final results by combining a ranking of general search results corresponding to the Web domain and dynamic deeplinks corresponding to the ranked list of URL's, wherein generating the final search results comprises one of de-duplicating or merging entries from the general search results and the ranked list of URL's, and the post-processor further weights the entries to combine the entries from the general search results and the ranked list of URL's, the weighting derived from machine learning.

18. The apparatus of claim 17, the deeplinks ranker being trained according to a plurality of training pairs, each training pair comprising a training query and an indexed Uniform Resource Locator (URL), and a log-based normalized discounted cumulative gain (LNDCG) calculated for each of the plurality of training pairs.

19. The apparatus of claim 17, the plurality of URL's being retrieved from submitting the revised query to a first layer of a Web search engine.

20. The apparatus of claim 17, the query-level features comprising a user location.

* * * * *